(12) United States Patent
Kim

(10) Patent No.: US 6,535,239 B1
(45) Date of Patent: Mar. 18, 2003

(54) CAMERA MOUNTED TWO-WAY WIRELESS PERSONAL VIDEO/AUDIO COMMUNICATION SYSTEM

(75) Inventor: Hyung-Tae Kim, Incheon (KR)

(73) Assignee: Wooju Communications Co., Ltd., Incheon (KR)

(*) Notice: Subject to any disclaimer, the term of this patent is extended or adjusted under 35 U.S.C. 154(b) by 0 days.

(21) Appl. No.: 09/498,310

(22) Filed: Feb. 4, 2000

(30) Foreign Application Priority Data

Feb. 5, 1999 (KR) .......................................... 1999-3897

(51) Int. Cl.[7] ................................................ H04N 7/14
(52) U.S. Cl. ..................................... 348/14.02; 455/556
(58) Field of Search ........................... 348/14.01, 14.02, 348/14.07, 14.11, 14.14, 14.16; 379/90.01, 110.01, 93.17; 455/550, 556, 557

(56) References Cited

U.S. PATENT DOCUMENTS 5,491,507 A * 2/1996 Umezawa et al. ........ 348/14.02

FOREIGN PATENT DOCUMENTS

WO  WO 96/38762  * 12/1996 .............. 348/14.02
WO  WO 97/26744  *  7/1997 .............. 348/14.02

* cited by examiner

Primary Examiner—Wing Chan
(74) Attorney, Agent, or Firm—Lee & Hong

(57) ABSTRACT

A two-way wireless personal video/audio communication system comprises a microprocessor unit for controlling the overall operation of the system. Audio and video transmission/reception circuits are responsive to audio and video channel control signals and audio and video transmission control signals from the microprocessor unit, for adjusting audio and video transmission/reception channel frequencies and driving audio and video power amplifiers, respectively. A video path control circuit acts to transfer a video signal from a camera circuit to a display circuit in an N mode, a video signal from a remote terminal, received through the video transmission/reception circuit, to the display circuit in an R mode and the video signal from the camera circuit to both the display circuit and video transmission/reception circuit in an X mode. When a video freeze switch is turned on, the video path control circuit blocks a moving image from the camera circuit and receives a freeze image from a video memory control circuit. When the video freeze switch is turned on in the X mode, the video memory control circuit captures the video signal from the camera circuit in an instant, stores the captured video signal as the freeze image in a video memory and outputs the stored freeze image to the video path control circuit.

20 Claims, 6 Drawing Sheets

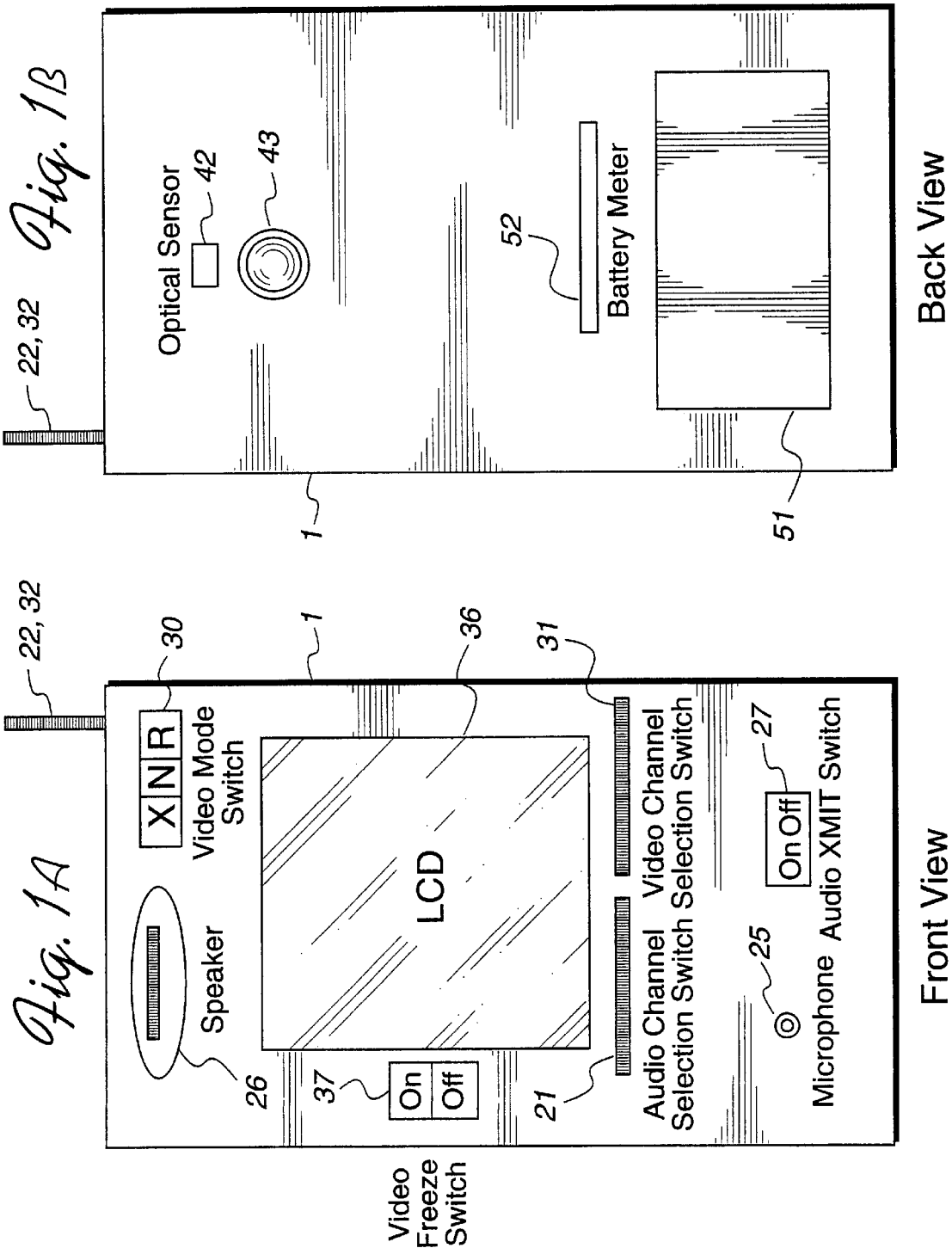

Signal Path for Video Signal Control Circuit
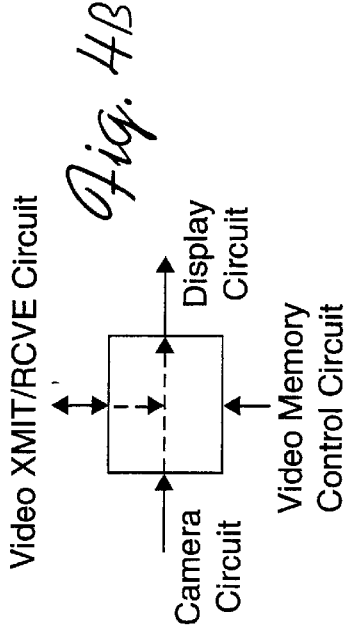
(A) N Position Selected
*Fig. 4A*
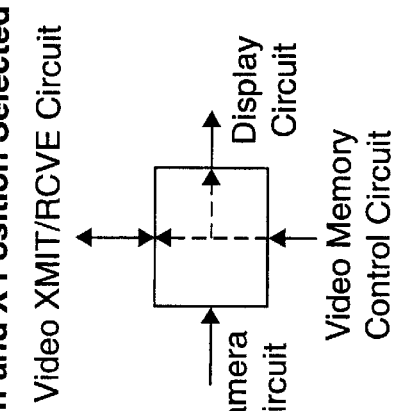
(B) R Position Selected
*Fig. 4B*
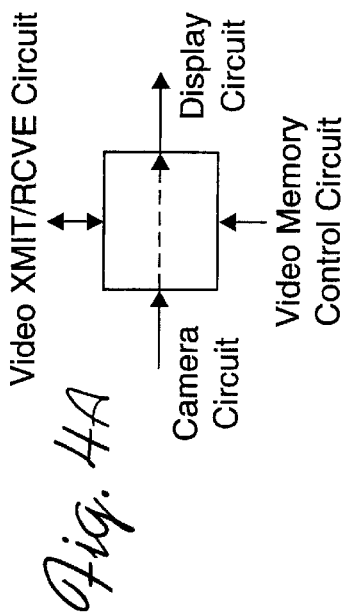
(C) X Position Selected
*Fig. 4C*
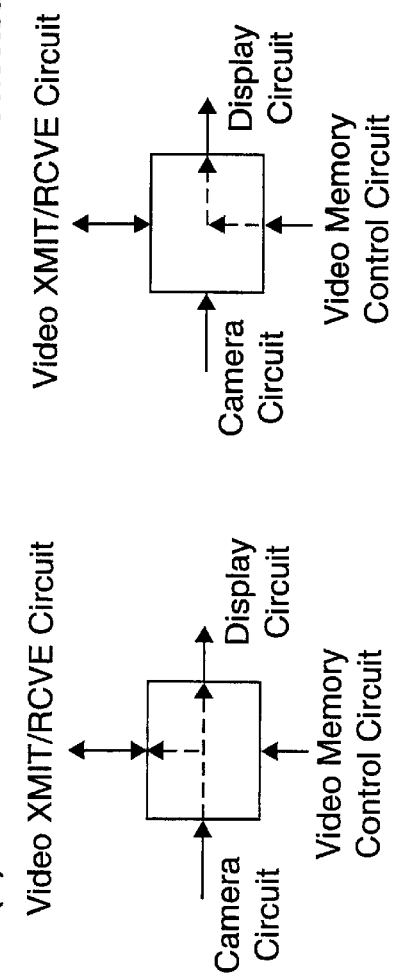
(D) Video Freeze Switch on and N Position Selected
*Fig. 4D*
(E) Video Freeze Switch on and X Position Selected
*Fig. 4E*

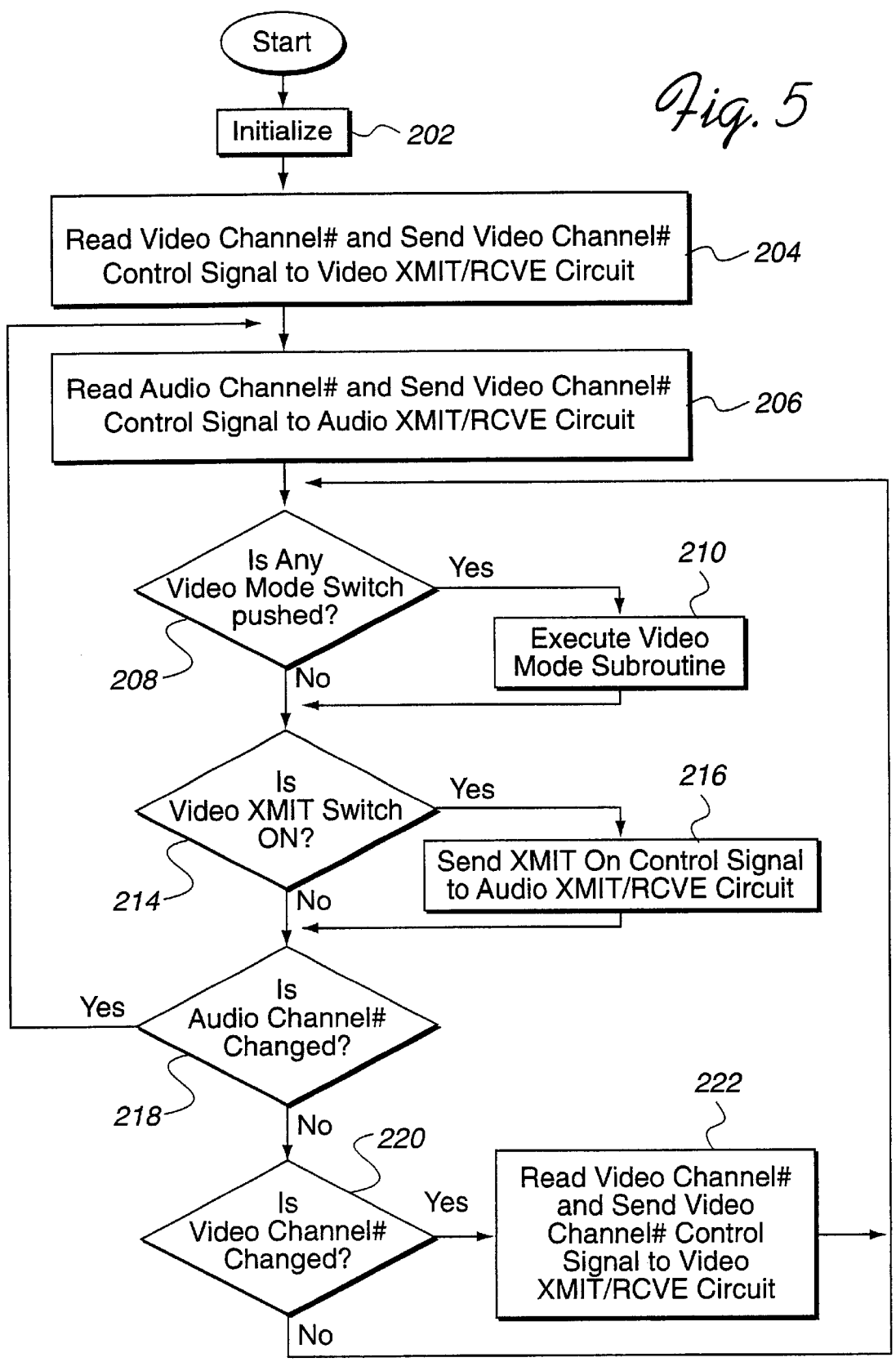

CAMERA MOUNTED TWO-WAY WIRELESS PERSONAL VIDEO/AUDIO COMMUNICATION SYSTEM

CROSS REFERENCE TO RELATED ART

This application claims the benefit of Korean Patent Application No. 1999-3897, filed on Feb. 5, 1999, which is hereby incorporated by reference.

BACKGROUND OF THE INVENTION

1. Field of the Invention

The present invention relates to a camera-mounted wireless communication system, and more particularly, to a two-way wireless portable video/audio communication system for transmitting and receiving video and audio signals using a microcomputer.

2. Discussion of the Related Art

In conventional communication fields, such as a wireless two-way radio communication system, video transmission and wireless video transmission, there have been provided a variety of devices capable of transmitting and receiving audio and video signals by wireless means or by wire. These video communication devices may be of such a desktop type or cabinet type that they are de signed with no restriction in device size and operating power, but they are not suitable for a portable device.

On the other hand, according to the rapid development of computer communication techniques, a wire less portable video communication device capable of overcoming restrictions in space and time has been required by enterprises or persons in various industrial fields.

SUMMARY OF THE INVENTION

Accordingly, the present invention is directed to a two-way portable wireless video/audio communication system that substantially obviates one or more of the problems due to limitations and disadvantages of the related art.

Therefore, the present invention has been made in view of the above problems, and it provides a wireless communication system with the same industrial applicability and object as those in a wireless communication system shown in Korean Patent Application No. 1999-634 and its counterpart U.S. patent application Ser. No. 09/481,652, which are incorporated herein by reference. More particularly, the present invention provides a wireless communication system which is capable of being efficiently controlled by a microcomputer.

It is an object of the present invention to provide a two-way portable wireless video/audio communication system in which a portable terminal is used in a hand-held manner and includes a video input camera and a video output display, thereby implementing wireless video communication together with audio communication.

It is another object of the present invention to provide a personal video communication system in which a plurality of identical personal terminals constitute one communication group operating at the same frequency.

It is another object of the present invention to provide a video communication system in which a portable terminal includes transmission on/off switches for video and audio signals so that it can be driven in a battery power saving manner.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a portable wireless communication system having a microprocessor unit having a memory, the microprocessor unit checking states of a video mode switch, an audio transmission switch, a video channel selection switch, an audio channel selection switch and a video freeze switch and generating a plurality of control signals to a video transmission/reception circuit, an audio transmission/reception circuit, a video path control circuit and a video memory control circuit in accordance with the checked results; the audio transmission/reception circuit being connected between an audio antenna and an audio circuit, the audio circuit including a microphone and a speaker, and responsive to an audio channel control signal and an audio transmission control signal from the microprocessor unit, for adjusting an audio transmission/reception channel frequency and driving an audio power amplifier; the video transmission/reception circuit being connected between a video antenna and the video path control circuit and responsive to a video channel control signal and a video transmission control signal from the microprocessor unit, for adjusting a video transmission/reception channel frequency and driving a video power amplifier; the video path control circuit being responsive to a video path control signal from the microprocessor unit corresponding to any one of N, X and R modes selected by the video mode switch, for transferring a video signal from a camera circuit to a display circuit in the N mode, a video signal from a remote terminal, received through the video transmission/reception circuit, to the display circuit in the R mode and the video signal from the camera circuit to both the display circuit and video transmission/reception circuit in the X mode and responsive to a video path control signal from the microprocessor unit corresponding to an on state of the video freeze switch, for blocking a moving image from the camera circuit and receiving a freeze image from the video memory control circuit; and the video memory control circuit being responsive to a video capture command from the microprocessor unit corresponding to the on state of the video freeze switch in the X mode, for capturing the video signal from the camera circuit in an instant, storing the captured video signal as the freeze image in a video memory and outputting the stored freeze image to the video path control circuit.

According to another embodiment of the present invention, a method of transmitting receiving video and audio signal using a portable wireless communication system comprises the steps of: (a) checking states of a video mode switch, an audio transmission switch, a video channel selection switch, an audio channel selection switch and a video freeze switch and generating a plurality of control signals to a video transmission/reception circuit, an audio transmission/reception circuit, a video path control circuit and a video memory control circuit in accordance with the checked results; (b) sending an audio channel control signal and an audio transmission control signal to the audio transmission/reception circuit to adjust an audio transmission/reception channel frequency and drive an audio power amplifier, the audio transmission/reception circuit being connected between an audio antenna and an audio circuit, the audio circuit including the microphone and speaker; (c) sending a video channel control signal and a video transmission control signal to the video transmission/ reception circuit to adjust a video transmission/reception channel frequency and drive a video power amplifier, the video transmission/reception circuit being connected between a video antenna and the video path control circuit; (d) sending a video path control signal corresponding to any one of N, X and R modes selected by the video mode switch to the video path control circuit to transfer a video signal from a camera circuit to a display circuit in the N mode, a video signal from a remote terminal, received through the video transmission/reception circuit, to the display circuit in the R mode and the video signal from the camera circuit to both the display circuit and video transmission/reception circuit in the X mode and sending a video path control signal corresponding to an on state of the video freeze switch to the video path control circuit to block a moving image from the camera circuit and receive a freeze image from the video memory control circuit; and (e) sending a video capture command corresponding to the on state of the video freeze switch in the X mode to the video memory control circuit to capture the video signal from the camera circuit in an instant, store the captured video signal as the freeze image in a video memory and output the stored freeze image to the video path control circuit.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

FIGS. 1A and 1B are front and rear views of a first embodiment of a portable terminal used in a wireless communication system of the present invention;

FIG. 4A illustrates a video signal path when an N mode is selected;

FIG. 4B illustrates a video signal path when an R mode is selected;

FIG. 4C illustrates a video signal path when an X mode is selected;

FIG. 4D illustrates a video signal path when a video freeze switch is activated and the N mode is selected;

FIG. 4E illustrates a video signal path when the video freeze switch is activated and the X mode is selected;

FIG. 5 is a flowchart of the operation of the wireless communication system in accordance with the preferred embodiment of the present invention.

DETAILED DESCRIPTION OF THE PREFERRED EMBODIMENTS

With reference to the drawings, and in particular to FIGS. 1A–6 thereof, a wireless communication system embodying the principles and concepts of the present invention will be described.

Figure 2A:
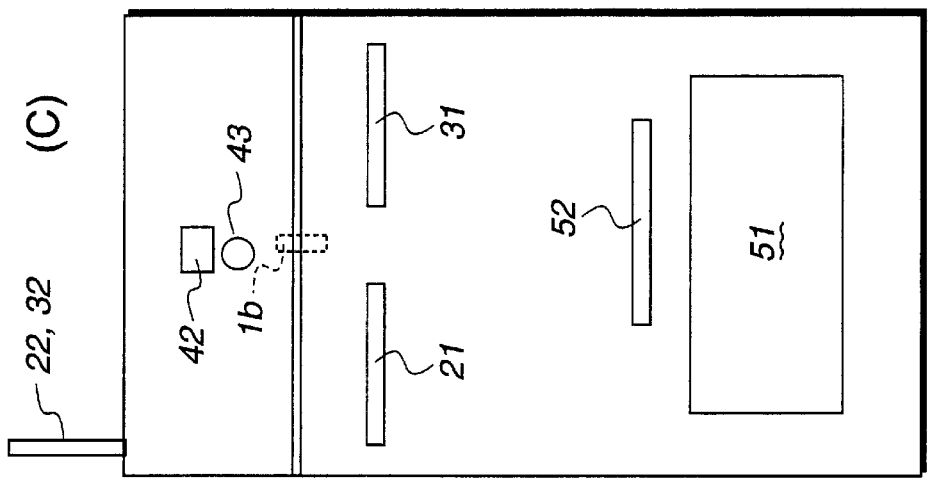
FIG. 2A is a front view of a second embodiment of the portable terminal used in the wireless communication system of the present invention.
Figure 2B:
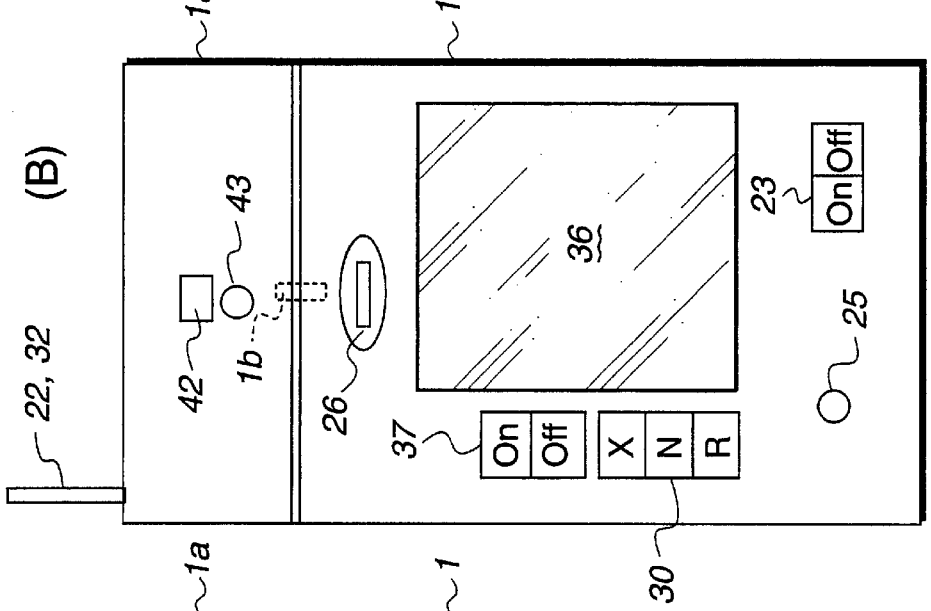
FIG. 2B is a front view illustrating a state where a head portion of the portable terminal shown in FIG. 2A is rotated by 180 degrees.
Figure 2C:
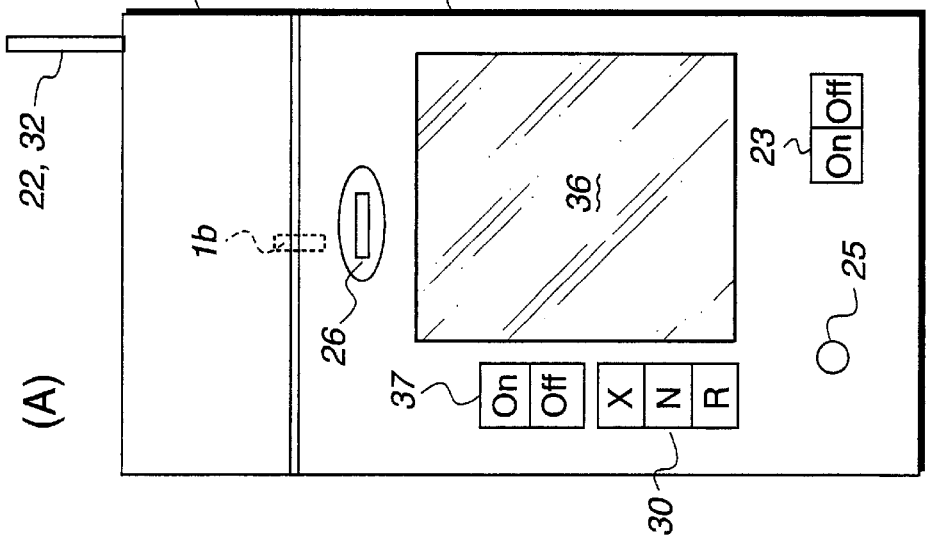
FIG. 2C is a rear view of the second embodiment of the portable terminal shown in FIG. 2A.

FIGS. 1A and 1B illustrate a first embodiment of a portable terminal 111 applied to a portable wireless communication system of the present invention. As shown in these drawings, the portable terminal 1 preferably comprises antennas 22 and 32 on its top, a speaker 26, video mode switch 30, video freeze switch 40, display 36, audio channel selection switch 21, video channel selection switch 31, character liquid crystal display (LCD) 13, microphone 25 and audio transmission (XMIT) switch 27 on its one side, and an optical sensor 42, camera lens 43, battery 51 and battery meter 52 on its other side. In FIGS. 1A and 1B, the antennas 22 and 32, which are for transmitting or receiving video and audio signals, are shown as one device. FIGS. 2A to 2C illustrate a second embodiment of the portable terminal applied to the communication system of the present invention. Referring to FIGS. 2A–2C, the second embodiment is the same in construction as the first embodiment of FIGS. 1A and 1B, with the exception that a head section 1a of the portable terminal 1 containing the optical sensor 42 and camera lens 43 is separated from the body of the portable terminal 1 and rotatably coupled with the terminal body by a support shaft 1b. The camera lens 43 may be positioned as shown in FIG. 2A or on the same section as the microphone 25 as shown in FIG. 2B to transmit an image.

Figure 3:
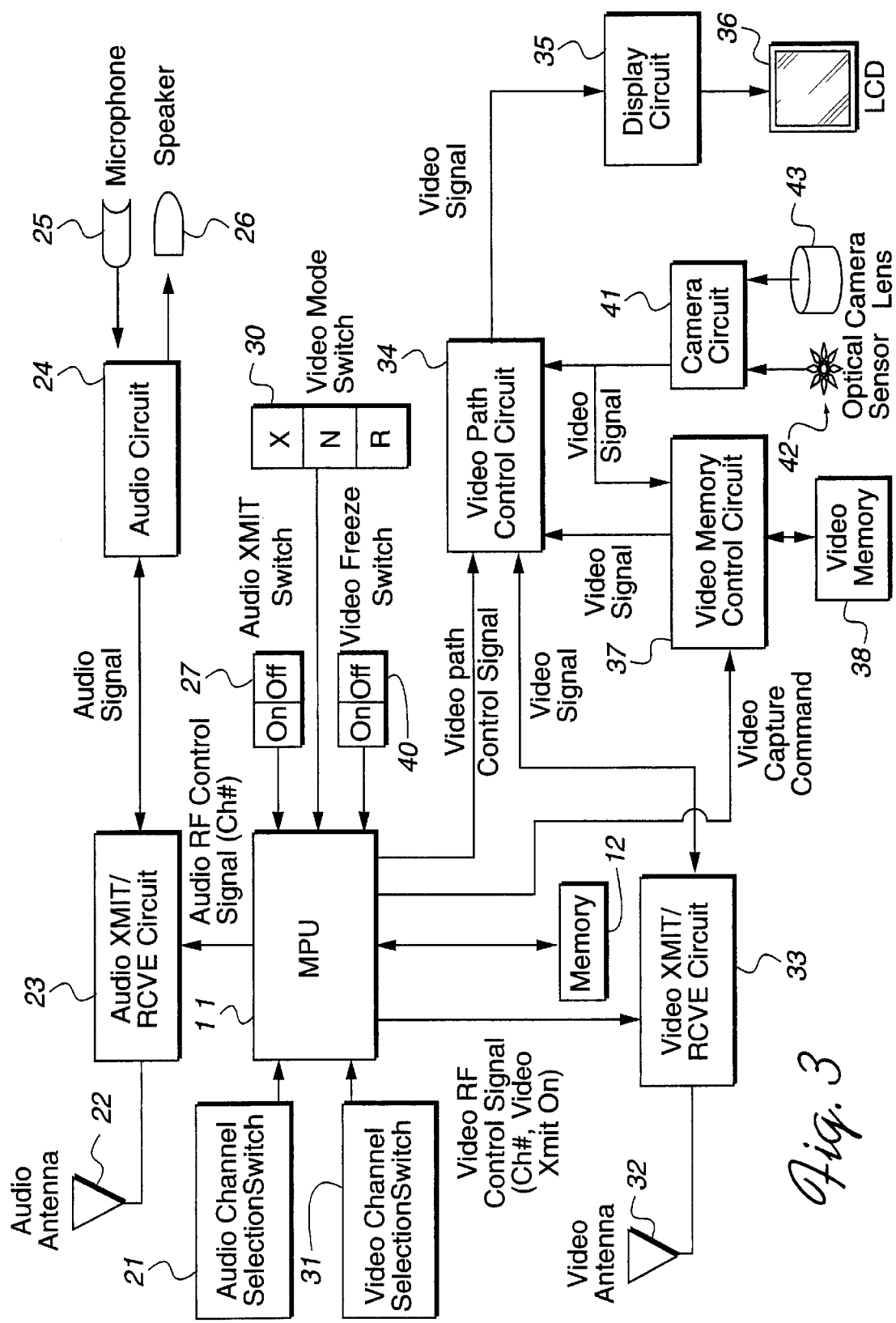
FIG. 3 is a system block diagram of the wireless communication system in accordance with the preferred embodiment of the present invention.

FIG. 3 is a system block diagram of the wireless communication system in accordance with the preferred embodiment of the present invention. Referring to FIG. 3, a microprocessor unit (MPU) 11 is adapted to control an audio transmission/reception (XMIT/RCVE) circuit 23, a video transmission/reception (XMIT/RCVE) circuit 33 and circuits associated therewith and to monitor user interface control switches. In FIG. 3, the MPU 11 is a central processing unit, which is the kernel of the system for controlling the overall operation of the communication system according to a program stored in a memory 12.

If the video channel selection switch 31 or the audio channel selection switch 21 selects a video channel or audio channel, the MPU 11 reads a value corresponding to the selected video or audio channel and sets a corresponding frequency for transmission/reception based on the set value. Then, the MPU 11 performs desired control operations depending on states selected by the video mode switch 30, video freeze switch 40 and audio transmission switch 27. Preferably, the memory 12 stores one or more programs for controlling the operations of the MPU 11. The MPU 11 reads or writes desired variables or constants from/into the memory 12 while executing the program. Moreover, the character LCD 13 displays an operating state of the system, a video channel number, an audio channel number, a used state of the battery 51, a video reception level and other pertinent data.

The video transmission/reception circuit module 33 modulates a video signal from a video path control circuit 34 into a radio frequency (RF) signal and transmits the modulated RF signal to a remote terminal through the video antenna 32. Also, the video transmission/reception circuit 33 receives an RF signal from the remote terminal through the video antenna 32 and demodulates the received RF signal into a video signal. At this time, the MPU 11 reads a video channel number from the video channel selection switch 31 and sends a video channel control signal Ch2 corresponding to the read video channel number to the video transmission/reception circuit 33, thereby allowing the video transmission/reception circuit 33 to select a corresponding frequency for the RF modulation/demodulation.

For example, when the video mode switch 30 is set to a transmission mode X, the MPU 11 sends a video transmission control signal On2 to the video transmission/reception circuit 33, thereby allowing a power amplifier in the video transmission/reception circuit 33 to output power for transmission. As a result, the video transmission/reception circuit 33 transmits the video signal from the video path control circuit 34 at the transmission power from the power amplifier.

In the case where the video mode switch 30 is set to a reception mode R, the video transmission/reception circuit 33 receives the RF signal from a remote terminal through the video antenna 32, demodulates such signal into a video signal and transfers the demodulated video signal to the video path control circuit 34.

The video antenna 32 transmits the RF video signal from the video transmission/reception circuit 33 to the remote terminal over a public line or receives the RF video signal from the remote terminal and supplies it to the video transmission/reception circuit 33.

The audio transmission/reception circuit module 23 modulates an audio signal from an audio circuit 24 into an RF signal and transmits the modulated audio RF signal to the remote terminal through the audio antenna 22. Also, the audio transmission/reception circuit 23 receives an RF signal from the remote terminal through the audio antenna 22, demodulates the received RF signal into an audio signal and transfers the demodulated audio signal to the audio circuit 24.

At this time, the MPU 11 reads an audio channel number from the audio channel selection switch 21 and sends an audio channel control signal Ch1 corresponding to the read audio channel number to the audio transmission/reception circuit 23, thereby allowing the audio transmission/reception circuit 23 to select a corresponding frequency for the RF modulation/demodulation.

When the audio transmission switch 27 is turned on, the MPU 11 sends an audio transmission control signal On1 to the audio transmission/reception circuit 23, thereby allowing a power amplifier in the audio transmission/reception circuit 23 to output power for transmission. Further, the audio transmission/reception circuit 23 demodulates the received RF signal into an audio signal and transfers the demodulated audio signal to the audio circuit 24 to output it through the speaker 26.

According to the present invention, the audio antenna 22 transmits the RF audio signal from the audio transmission/reception circuit 23 to one or more remote terminals or receives the RF audio signal from a remote terminal and supplies it to the audio transmission/reception circuit 23. The audio circuit 24 amplifies the audio signal from the audio transmission/reception circuit 23 and outputs the amplified audio signal to the speaker 26. Also, the audio circuit 24 amplifies an audio signal from the microphone 25 and transfers the amplified audio signal to the audio transmission/reception circuit 23.

The audio channel selection switch 21 functions to set an audio transmission/reception frequency between transmission and reception terminals. Namely, the audio channel selection switch 21 selects a specific one of a plurality of audio channels, into which an available frequency range for transmission/reception of an audio signal is partitioned, so as to prevent an interference among a plurality of terminal groups in the same area. The MPU 11 reads a value corresponding to the specific audio channel selected in the above manner, and sends the read value to the audio transmission/reception circuit 23, so that the audio transmission/reception circuit 23 can select a carrier frequency for modulation/demodulation of the audio signal.

The video channel selection switch 31 functions to set a video transmission/reception frequency between transmission and reception terminals. That is, the video channel selection switch 31 selects a specific one of a plurality of video channels, into which an available frequency range for transmission/reception of a video signal is partitioned, so as to prevent an interference among a plurality of terminal groups in the same area. The MPU 11 reads a value corresponding to the specific video channel, selected in the above manner, and sends the read value to the video transmission/reception circuit 33, so that the video transmission/reception circuit 33 can select a carrier frequency for modulation/demodulation of the video signal.

The video mode switch 30 is used to select a desired one of, for example, three modes, N, R and X, for video communication and notify the MPU 11 of the selected mode. The MPU 11 reads a selected position of the video mode switch 30 and controls the video path control circuit 34 in accordance with the read position to provide a path through which a video signal is passed. The video freeze switch 40 operates under the control of the user to instruct the MPU 11 to capture a freeze image of one shot among moving images inputted to a camera circuit 41.

Referring to FIGS. 4A to 4E, the video path control circuit 34 provides video paths under the control of the MPU 11. For example, when the video mode switch 30 is set to the N mode by the user, the video path control circuit 34 operates under the control of the MPU 11 to transfer a video signal from the camera circuit 41 to a display circuit 35 as shown in FIG. 4A, in order not to transmit an image picked up by a camera to the remote terminal but to reproduce it on the display 36 in the same terminal, which may be an LCD or other display.

When the video mode switch 30 is set to the R mode by the user, the video path control circuit 34 is operated under the control of the MPU 11 to transfer a video signal from the remote terminal, received through the video antenna 32 and video transmission/reception circuit 33, to the display circuit 35 as shown in FIG. 4B to display an image from the remote terminal on the display 36.

If the video mode switch 30 is set to the X mode by the user, the video path control circuit 34 operates under the control of the MPU 11 to transfer the video signal from the camera circuit 41 to both the display circuit 35 and video transmission/reception circuit 33 as shown in FIG. 4C to transmit the image picked up by the camera to the remote terminal while reproducing it on the display 36.

When the video freeze switch 40 is activated, the MPU 11 controls both the video path control circuit 34 and a video memory control circuit 37. As a result, the video memory control circuit 37 captures the video signal from the camera circuit 41 in an instant and stores the captured video signal as a freezed image in a video memory 38. Thereafter, when the video mode switch 30 is set to the N mode, the video path control circuit 34 transfers a freeze video signal from the video memory control circuit 37 to the display circuit 35 as shown in FIG. 4D to display the freeze image stored in the video memory 38 on the display 36. When the video mode switch 30 is set to the X mode, the video path control circuit 34 transfers the freeze video signal from the video memory control circuit 37 to both the display circuit 35 and video transmission/reception circuit 33 as shown in FIG. 4E to transmit the freeze image stored in the video memory 38 to the remote terminal while reproducing it on the display 36 in the self terminal.

In the preferred embodiment, the video memory 38 is adapted to store a freeze image in the above manner. The camera circuit 41 is adapted to convert an image incident on the camera lens 43 into an electrical video signal. Further, the camera circuit 41 adjusts the level of the electrical video signal according to the amount of light sensed by the optical sensor 42 in such a manner that the video signal can appropriately be viewed on the display 36. The camera circuit 41 includes the camera lens 43 and optical sensor 42 constitute a typical video camera. The optical sensor 42 is connected to the camera circuit 41 for reference to the amount of light incident on the camera lens 43.

The display circuit 35 is adapted to convert a video signal from the video path control circuit 34 into an LCD driver signal or other display signal known to one of ordinary skill in the art. The display circuit 35 outputs the converted display signal to the display 36 to reproduce an image picked up by the camera lens 43 on the display 36.

The video antenna 32 and audio antenna 22 are shown in FIG. 3 to be separately provided for the video and audio communications. Alternatively, one antenna, into which the video and audio antennas are unified, such as a dualband or multiband antenna, may be provided for the video and audio communications.

Various frequencies, approved by the appropriate government agency, are available for transmission/reception of an audio signal. Frequency bands of 900 MHz, 2.4 GHz, 5.8 GHz, etc., are available for transmission/reception of a video signal. The frequency band of 900 MHz has a narrow, allowable bandwidth that it cannot accommodate a large number of video channels. However, the high frequency bands, such as 2.4 GHz, 5.8 GHz, etc., have broader bandwidths that they can be partitioned into a large number of video channels. A bandwidth of 4–6 MHz must be assigned to every video channel to obtain a definite picture. A part of the video frequency bands may be specified and used for audio channels. In this case, a video antenna may be used in common for transmission/reception of audio and video signals with no necessity for using an audio antenna separately.

FIG. 5 is a flowchart of the operation of the wireless communication system in accordance with the present invention. First, in step 202 the system is initialized. In step 204, the MPU 11 reads a video channel number from the video channel selection switch 31 and sends a video channel control signal Ch2 corresponding to the read video channel number to the video transmission/reception circuit 33. In step 206, the MPU 11 reads an audio channel number from the audio channel selection switch 21 and sends an audio channel control signal Ch1 corresponding to the read audio channel number to the audio transmission/reception circuit 23. Then, in step 208, the MPU 11 determines whether the video mode switch 30 has been activated and executes a subroutine for video mode selection in step 210 if the video mode switch 30 has been activated. If the video mode switch 30 has not been activated, in step 214 the MPU 11 determines whether the audio transmission switch 27 has been activated. If activated, the MPU 11 sends an audio transmission control signal On1 to the audio transmission/reception circuit 23 in step 216.

If the audio transmission switch 27 has not been activated, the MPU 11 checks the audio channel selection switch 21 in step 218 to determine whether the audio channel number has been changed from a previous value. In the case where the audio channel number has been changed, the MPU 11 reads the changed audio channel number from the audio channel selection switch 21 in step 206 and sends an audio channel control signal Ch1 corresponding to the newly read audio channel number to the audio transmission/reception circuit 23. As a result, the audio transmission/reception circuit 23 is adjusted to a corresponding channel frequency designated by the changed audio channel number.

If the audio channel number has not been changed, the MPU 11 checks the video channel selection switch 31 in step 220 to determine whether the video channel number has been changed from a previous value. If the video channel number has been changed, the MPU 11 reads the changed video channel number in step 222 from the video channel selection switch 31 and sends a video channel control signal Ch2 corresponding to the newly read video channel number to the video transmission/reception circuit 33. As a result, the video transmission/reception circuit 33 is adjusted to a corresponding channel frequency designated by the changed video channel number. If the video channel number has not been changed, the MPU 11 returns to the step 208 of determining whether the video mode switch 30 has been activated. Therefore, an audio/video control detection loop is formed in the above manner.

Figure 6:
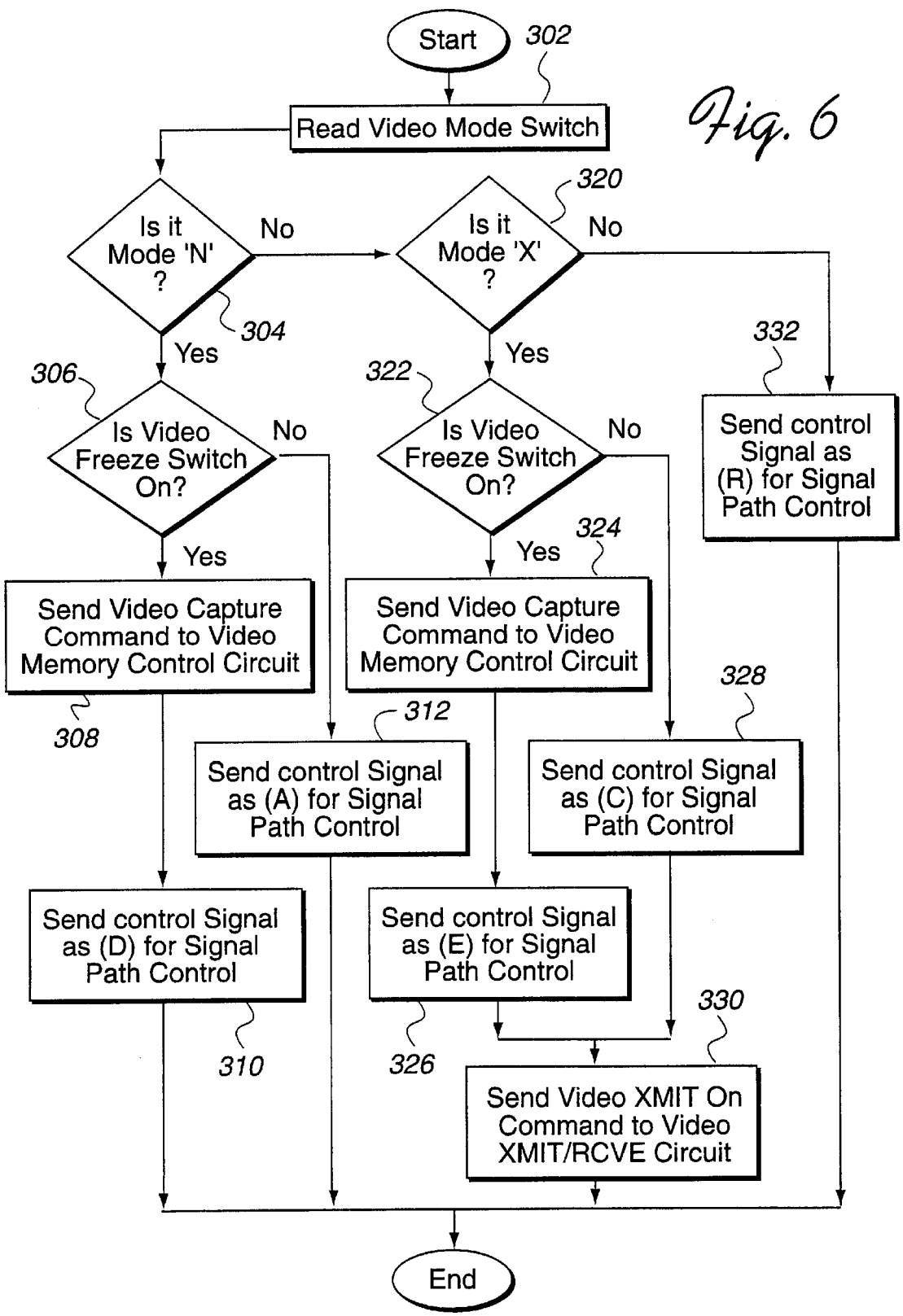
FIG. 6 is a flowchart of a subroutine being executed when the video mode is activated as shown in FIG. 5.

FIG. 6 is a flowchart of a subroutine being executed when the video mode is activated in FIG. 5. In the video mode selection subroutine of FIG. 6, the MPU 11 performs separate operations corresponding to the setting of the video mode switch 30.

In step 302, the MPU 11 reads the status of the video mode switch 30. If the video mode switch 30 is set to the N mode in step 304, the MPU 11 determines in step 306 whether the video freeze switch 40 has been activated. If the video freeze switch 40 has been activated, the MPU 11 sends a video capture command to the video memory control circuit 37 in step 308. Further, the MPU 11 sends a video path control signal to the video path control circuit 34 to establish a video signal path as shown in FIG. 4D in step 310. As a result, the video path control circuit 34 transfers a freeze image stored in the video memory 38 to the display circuit 35 to display it on the display 36.

If the video freeze switch 40 has not been activated, the MPU 11 sends a video path control signal to the video path control circuit 34 in step 312 to establish a video signal path as shown in FIG. 4A. As a result, the video path control circuit 34 transfers a video signal from the camera circuit 41 to the display circuit 35 to display it on the display 36.

In the case where the video mode switch 30 is set to the X mode in step 320, the MPU 11 determines whether the video freeze switch 40 has been activated in step 322 and sends the video capture command to the video memory control circuit 37 in step 324. Then, in step 326 the MPU 11 sends a video path control signal to the video path control circuit 34 to establish a video signal path as shown in FIG. 4E. As a result, the video path control circuit 34 transfers the freeze image stored in the video memory 38 to both the display circuit 35 and video transmission/reception circuit 33. Subsequently, in step 330 the MPU 11 sends the video transmission control signal On2 to the video transmission/reception circuit 33. Hence, the freeze image stored in the video memory 38 is displayed simultaneously on the displays 36 in the local and remote terminals.

If the video freeze switch 40 is not activated, the MPU 11 sends a video path control signal to the video path control circuit 34 to establish a video signal path as shown in FIG. 4C in step 328. As a result, the video path control circuit 34 transfers a moving image from the camera circuit 41 to both the display circuit 35 and video transmission/reception circuit 33. Then, in step 330 the MPU 11 sends the video transmission control signal On2 to the video transmission/reception circuit 33. Accordingly, the moving image from the camera circuit 41 is displayed simultaneously at the displays 36 in the self and remote terminals.

In the case where the video mode switch 30 is set to the R mode, the MPU 11 sends a video path control signal to the video path control circuit 34 to establish a video signal path as shown in FIG. 4B in step 332. As a result, the video path control circuit 34 transfers a video signal from the remote terminal, received through the video transmission/reception circuit 33, to the display circuit 35 to monitor an image from the remote terminal on the display 36.

As apparent from the above description, the present invention provides a two-way wireless personal video/audio communication system wherein a personal portable terminal includes a video input camera and video output display controlled by a microcomputer, thereby implementing wireless audio and video communications. Further, according to the present invention, two or more identical portable terminals constitute one communication group operating at the same frequency. Moreover, a portable terminal includes transmission on/off switches for selectively transmitting video and audio signals to preserve battery power.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A portable wireless communication system for processing audio and video signal and having a microphone, a speaker and an antenna, the communication system comprising:
   a microprocessor for controlling operations of the communication system;
   a memory connected to the microprocessor for storing instructions to be processed by the microprocessor;
   a video transmission/reception circuit connected to the transmission/reception antenna and being responsive to the microprocessor;
   a video path control circuit connected to and responsive to the microprocessor for controlling video transmission of the communication system;
   a video memory control circuit connected to the video path control circuit and being responsive to the microprocessor;
   a video mode switch connected to the microprocessor to input video transmission options thereto;
   wherein the microprocessor generates a plurality of video control signals to the video transmission/reception circuit, the video path control circuit and the video memory control circuit in accordance with the status of the video mode switch, and wherein
     the video path control circuit being responsive to a video path control signal from the microprocessor corresponding to any one of first (N), second (R) and third (X) modes selected by the video mode switch, for transferring a video signal from a camera circuit to a display circuit in the first mode, a video signal from a remote terminal, received through the video transmission/reception circuit, to the display circuit in the second mode and the video signal from the camera circuit to both the display circuit and video transmission/reception circuit in the third mode; and
     the video memory control circuit being responsive to a video capture command from the microprocessor unit corresponding to a setting of the video freeze switch in the third mode, for capturing the video signal from the camera circuit, storing the captured video signal in a video memory and outputting the stored image to the video path control circuit.

2. The portable wireless communication system of claim 1, further comprising:
   a video freeze switch connected to the microprocessor for selecting one of a non-moving image and a moving image.

3. The portable wireless communication system of claim 2, wherein the microprocessor generates a video freeze signal in response to the video path control signal from the microprocessor and the video freeze switch, for receiving and processing the non-moving image from the video memory control circuit.

4. The portable wireless communication system of claim 1, further comprising:
   a video channel selection switch connected to the microprocessor for changing frequency of the video channel, wherein the microprocessor outputs a video channel control signal in response to a setting of the video channel selection switch.

5. The portable wireless communication system of claim 4, wherein the video transmission/reception circuit is responsive to the video channel control signal and a video transmission control signal from the microprocessor unit, for adjusting a video transmission/reception channel frequency.

6. The portable wireless communication system of claim 5, further comprising:
   a video channel selection switch connected to the microprocessor for changing frequency of the video channel, wherein the microprocessor outputs a video channel control signal in response to a setting of the video channel selection switch.

7. The portable wireless communication system of claim 6, wherein the video transmission/reception circuit is responsive to the video channel control signal and a video transmission control signal from the microprocessor unit, for adjusting a video transmission/reception channel frequency.

8. The portable wireless communication system of claim 1, further comprising:
   an audio transmission switch connected to the microprocessor for controlling audio transmission of signal received from the microphone.

9. The portable wireless communication system of claim 8, further comprising:
   an audio channel selection switch connected to the microprocessor for changing frequency of the audio channel, wherein the microprocessor outputs an audio channel control signal in response to a setting of the audio channel selection switch.

10. The portable wireless communication system of claim 9, further comprising an audio circuit for processing audio signal, wherein the audio circuit is connected to the microphone and the speaker.

11. The portable wireless communication system of claim 10, wherein the audio transmission/reception circuit connected to the antenna and the audio circuit is responsive to the audio channel control signal from the microprocessor unit, for adjusting an audio transmission/reception channel frequency.

12. The portable wireless communication system of claim 7, further comprising:
an audio transmission switch connected to the microprocessor for controlling audio transmission of signal received from the microphone.

13. The portable wireless communication system of claim 12, further comprising:
an audio channel selection switch connected to the microprocessor for changing frequency of the audio channel, wherein the microprocessor outputs an audio channel control signal in response to a setting of the audio channel selection switch.

14. The portable wireless communication system of claim 13, further comprising an audio circuit for processing audio signal, wherein the audio circuit is connected to the microphone and the speaker.

15. The portable wireless communication system of claim 14, wherein the audio transmission/reception circuit connected to the antenna and the audio circuit is responsive to the audio channel control signal from the microprocessor unit, for adjusting an audio transmission/reception channel frequency.

16. The portable wireless communication system of claim 1, wherein the antenna is a dual mode antenna for transmitting and receiving audio and video signals.

17. A portable wireless communication system for processing audio and video signal and having a microphone, a speaker and an antenna, the communication system comprising:
a microprocessor unit having a memory, the microprocessor unit checking states of a video mode switch, an audio transmission switch, a video channel selection switch, an audio channel selection switch and a video freeze switch and generating a plurality of control signals to a video transmission/reception circuit, an audio transmission/reception circuit, a video path control circuit and a video memory control circuit in accordance with the checked results;
the audio transmission/reception circuit being connected between an audio antenna and an audio circuit, the audio circuit including the microphone and speaker, and responsive to an audio channel control signal and an audio transmission control signal from the microprocessor unit, for adjusting an audio transmission/reception channel frequency and driving an audio power amplifier;
the video transmission/reception circuit being connected between a video antenna and the video path control circuit and responsive to a video channel control signal and a video transmission control signal from the microprocessor unit, for adjusting a video transmission/reception channel frequency and driving a video power amplifier;
the video path control circuit being responsive to a video path control signal from the microprocessor unit corresponding to any one of N, X and R modes selected by the video mode switch, for transferring a video signal from a camera circuit to a display circuit in the N mode, a video signal from a remote terminal, received through the video transmission/reception circuit, to the display circuit in the R mode and the video signal from the camera circuit to both the display circuit and video transmission/reception circuit in the X mode and responsive to a video path control signal from the microprocessor unit corresponding to an on state of the video freeze switch, for blocking a moving image from the camera circuit and receiving a freeze image from the video memory control circuit; and
the video memory control circuit being responsive to a video capture command from the microprocessor unit corresponding to the on state of the video freeze switch in the X mode, for capturing the video signal from the camera circuit in an instant, storing the captured video signal as the freeze image in a video memory and outputting the stored freeze image to the video path control circuit.

18. The portable wireless communication system of claim 17, wherein the video antenna and audio antenna are unified into one of a dual-band antenna and a multi-band antenna.

19. The portable wireless communication system of claim 17, wherein the camera circuit includes an optical sensor and a camera lens installed in a head section of the communication system, the head section being separated from a terminal body and rotatably coupled with the terminal body with a support shaft.

20. A method of transmitting/receiving video and audio signal using a portable wireless communication system having a microphone, a speaker and an antenna, the method comprising the steps of:
(a) checking states of a video mode switch, an audio transmission switch, a video channel selection switch, an audio channel selection switch and a video freeze switch and generating a plurality of control signals to a video transmission/reception circuit, an audio transmission/reception circuit, a video path control circuit and a video memory control circuit in accordance with the checked results;
(b) sending an audio channel control signal and an audio transmission control signal to the audio transmission/reception circuit to adjust an audio transmission/reception channel frequency and drive an audio power amplifier, the audio transmission/reception circuit being connected between an audio antenna and an audio circuit, the audio circuit including the microphone and speaker;
(c) sending a video channel control signal and a video transmission control signal to the video transmission/reception circuit to adjust a video transmission/reception channel frequency and drive a video power amplifier, the video transmission/reception circuit being connected between a video antenna and the video path control circuit;
(d) sending a video path control signal corresponding to any one of N, X and R modes selected by the video mode switch to the video path control circuit to transfer a video signal from a camera circuit to a display circuit in the N mode, a video signal from a remote terminal, received through the video transmission/reception circuit, to the display circuit in the R mode and the video signal from the camera circuit to both the display circuit and video transmission/reception circuit in the X mode and sending a video path control signal corresponding to an on state of the video freeze switch to the video path control circuit to block a moving image from the camera circuit and receive a freeze image from the video memory control circuit; and
(e) sending a video capture command corresponding to the on state of the video freeze switch in the X mode to the video memory control circuit to capture the video signal from the camera circuit in an instant, store the captured video signal as the freeze image in a video memory and output the stored freeze image to the video path control circuit.

* * * * *